F. P. McCOLL.
CAN SOLDERING MACHINE.
APPLICATION FILED SEPT. 15, 1910.
1,052,737.
Patented Feb. 11, 1913.
2 SHEETS—SHEET 1.
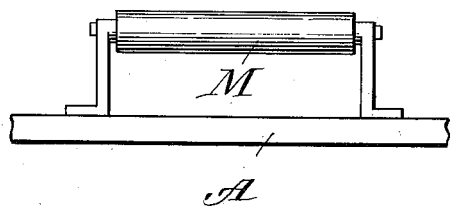
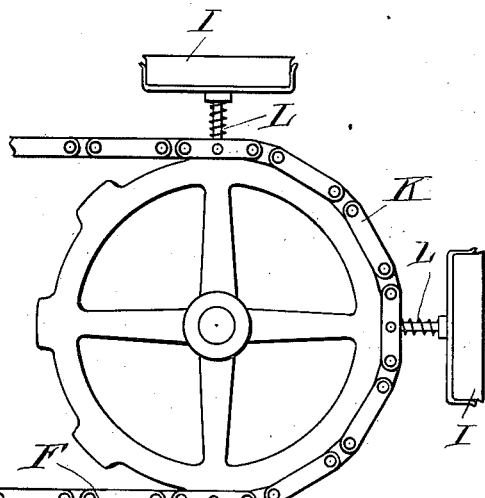
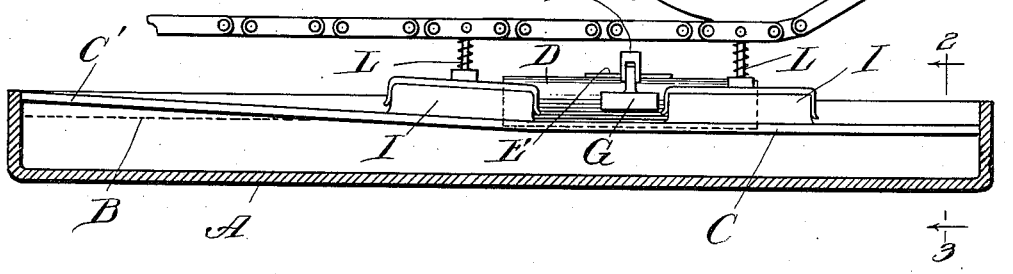
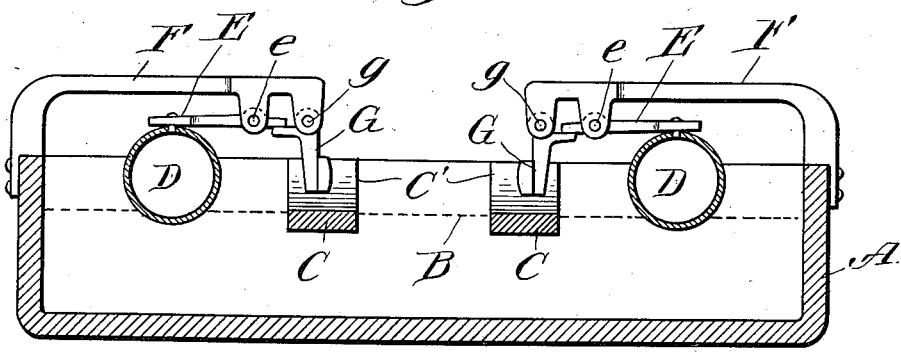
Witnesses:
Harry S. Gaither
Ruby V. Brydges
Inventor:
Francis P. McColl,
Chamberlin & Freudenreich
attys F. P. McCOLL.
CAN SOLDERING MACHINE.
APPLICATION FILED SEPT. 15, 1910.
1,052,737.
Patented Feb. 11, 1913.
2 SHEETS—SHEET 2.
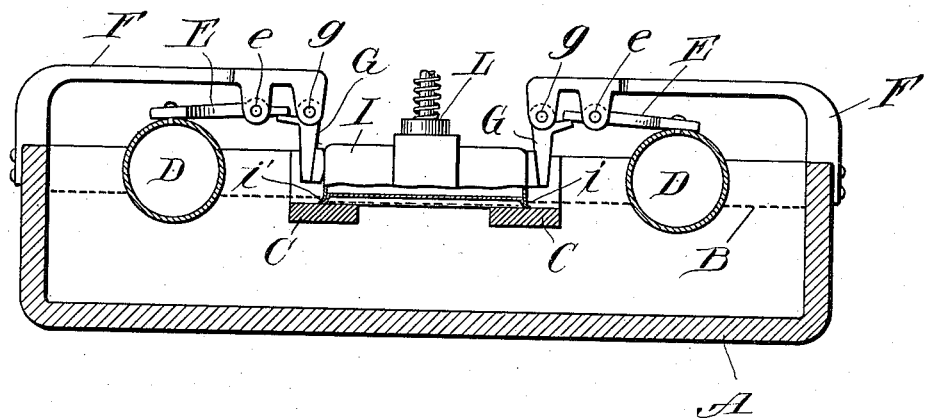
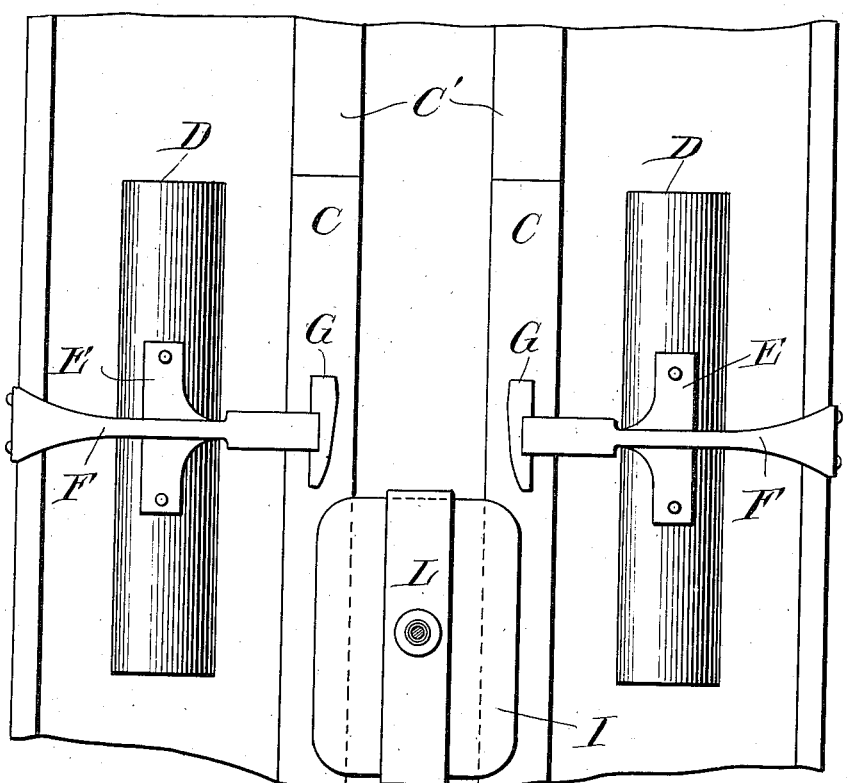
Witnesses:
Harry S. Gaither
Ruby V. Brydges
Inventor:
Francis P. McColl
by Chamberlin Grindemeid
attys

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

CAN-SOLDERING MACHINE.

1,052,737.   Specification of Letters Patent.   Patented Feb. 11, 1913.

Application filed September 15, 1910. Serial No. 582,175.

*To all whom it may concern:*

Be it known that I, FRANCIS P. McCOLL, a citizen of the United States, residing at St. Andrews, New Brunswick, Dominion of Canada, have invented a certain new and useful Improvement in Can-Soldering Machines, and declare the following to be a full, clear, and exact description of the same, such as will enable others skilled in the art to which it pertains to make and use the same, reference being had to the accompanying drawings, which form a part of this specification.

My invention relates to the art of soldering, particularly to the art of soldering cans, and has for its object the provision of an apparatus by which heads may be soldered into cans quickly and efficiently.

A further object of my invention is the provision of an apparatus or machine for soldering heads into cans which will permit the soldering operation to be performed without wasting solder or defacing the decorations on the can parts.

A further object of my invention is to provide an apparatus or a machine by which filled cans may be soldered without heating the contents and creating internal pressures.

The various features of novelty whereby my invention is characterized will hereinafter be pointed out with particularity in the claims; but for a full understanding of my invention and of its object and advantages, reference may be had to the following detailed description taken in connection with the accompanying drawings, wherein:

Figure 1 is a view partly in side elevation and partly in section, illustrating one form of apparatus for carrying out my invention;
Figs. 2 and 3 are sections on an enlarged scale on line 2—3 of Fig. 1, these two figures illustrating different positions of the parts; Fig. 4 is a view looking down on Fig. 2; and Fig. 5 is a section similar to Figs. 2 and 3 showing a modification.

Referring to Figs. 1 to 4 of the drawings; A is a receptacle for containing molten solder which is indicated at B. The member A may take any suitable form, the solder may be supplied thereto in any suitable way and the temperature of the bath may be maintained by any usual means: all these features of themselves constituting no part of my invention.

In accordance with my invention I provide means whereby the cans or other parts to be soldered are caused to travel across the bath and in close proximity thereto, together with means for producing relative vertical movements between the solder and the members to be soldered, without interrupting their travel. The extent of the relative movement is such as to cause the solder to engage with the parts to be soldered over minimum areas. As the travel of the members to be soldered continues, a relative vertical movement between them and the solder in the reverse direction occurs and the soldered members are then carried away. By this means the solder is applied at just the points where it is desired and is given no opportunity to encroach upon parts of the cans or other devices which should be left clean. In the arrangement shown, the relative movement between the cans and the solder is produced by causing the level of the solder to rise automatically at a predetermined point in the travel of the cans and to recede again after that point has been passed. To this end I have provided parallel guides C lying in the solder bath and having their upper surfaces arranged approximately in the plane of the solder. Between the guides and the sides of the solder container are floats D which rest upon the solder. Above the floats are levers E pivoted as at *e* between the ends thereof on stationary brackets F.

G represents shoes hung upon the inner ends of the brackets as at *g* and extending down over the guides. Each of the shoes is provided with a laterally projecting finger underlying the adjacent end of the corresponding lever. It will be seen that when the shoes are swung away from each other, the fingers will engage with the levers and swing them so as to depress the floats. The shoes are made wedge-shaped so that the transverse distance between their faces is less at one end than at the other. It will be seen that if the can or other member of proper size and shape is moved along the guides and into the flaring opening between the shoes, the shoes will be gradually swung outwardly, causing the floats to be depressed and the surface of the solder to be raised. The parts are so proportioned that when a can of proper size is carried along the guides, the solder will rise just high enough to make an effective joint between a head resting upon the guides and the can body. While the can is between the shoes the solder has time to act so that when the can passes the shoes and permits the floats to rise and the surface of the solder to sink, the soldering will have been completed. It will thus be seen that the area with which the solder engages is accurately determined so that there is no danger of applying an excess of solder or of applying it at points where it is not desired.

My invention is particularly applicable to cans which have cup-shaped heads inserted in such a manner that the mouths of the cups are directed outwardly, such a can being indicated at I. When such a can rests upon the guides it is supported upon flanges $i$, $i'$ which project beyond the head proper, these flanges consisting of the sides of the cup-shaped head and the portions of the can body in contact therewith. As the solder rises in the container it enters between the guides and beneath the can; but, because of the cup-shaped head, the air is pocketed beneath the can so that the solder does not rise high enough to engage with the main portion of the head. This has several advantages. In the first place a waste of solder is prevented because the solder on the inside of the flange rises to a less height than the solder on the outside; it being only necessary to have some solder on the inside so as to permit it to be drawn in between the sides of the head and the can body, any excess of solder which accumulates on the external surface of the head being wasted. Again, by preventing the solder from coming in contact with the head of the can the head will not be disfigured and it is therefore possible to solder a decorated head in place without danger of marring the decoration. Furthermore by keeping the hot solder away from the head of the can, heating of the contents of the can is avoided and therefore there are no internal pressures tending to disrupt the joint and produce leaks therein. I prefer to provide the head with a fin which projects slightly beyond the can body so as to give the solder ready access to the engaging surfaces of the can body and head. A can of this kind may be filled, the head pressed in place, and then soldered quickly and conveniently without danger of loss of the contents or leaks in the joint.

The raising of the surface of the solder is preferably accomplished without stopping the travel of the cans so that the cans are dipped, as it were, and immediately withdrawn. This movement of the cans may be effected by any suitable means. In the drawings I have illustrated a conveyer K having can holders L, the parts being so proportioned that cans in the holders are carried progressively over and past the bath. The holders are spaced far enough apart so that each can is given time to be dipped and withdrawn before a successive can comes upon the guides. When the cans have passed between the shoes they may be disposed of in any suitable way. In the arrangement shown, the guides have their upper faces inclined, as indicated at C' at the ends where the cans leave the bath. By this means each can, after the solder has receded, travels up the inclines and will therefore be held above the high level of the solder even though another can should enter the space between the shoes before the first can has passed completely over the container.

In Fig. 5 I have illustrated a different arrangement of the guides in the solder container, the guides here taking the form of rollers M. By using rollers the friction between the moving parts is decreased.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In a soldering machine, a solder bath, means for carrying a can to be soldered across and in proximity to said bath, and means controlled by said can for causing the solder to rise in the bath into contact with the can and to recede before the can has completed its travel across the bath.

2. In a soldering machine, a solder bath, means for supporting a part to be soldered above and in proximity to said bath, a device adapted to enter the solder and cause the level thereof to rise, and means governed by said part for controlling said device.

3. In a soldering machine, a solder bath, means for supporting a part to be soldered above and in proximity to said bath, a float supported by said bath, and means controlled by said part for forcing the float into the bath so as to raise the level of the solder sufficiently to bring it into engagement with said part.

4. In a soldering machine, a solder bath, means for carrying a part to be soldered across and in proximity to said bath, a device adapted to enter the solder so as to raise the level thereof, and means controlled by said part for causing said device to enter the solder during a portion of the travel of said part so as to cause the solder to rise into contact with said part.

5. In a soldering machine, a solder bath, means for carrying a part to be soldered across and in proximity to said bath, a float resting in said bath, and means controlled by said part for causing the float to be depressed during a portion of the travel of said part so as to raise the level of the solder sufficiently to bring it into engagement with said part.

6. In a soldering machine, a solder bath, guides extending through said bath with their upper surfaces approximately in the plane of the upper surface of the bath, means for moving a part to be soldered across said guides, and means controlled by said part for causing the level of the solder to rise into engagement with said part during a portion of the traveling movement of said part.

7. In a soldering machine, a solder bath, guides extending through said bath and having their upper surfaces lying approximately in the plane of the upper surface of the solder, a float resting in said solder, means for moving a part to be soldered across said guides, and means arranged to be controlled by said part for depressing said float during a portion of the travel of said part so as to raise the level of the solder and bring the solder into engagement with said part.

8. In a soldering machine, a solder bath, guides extending through said bath and having their upper surfaces lying approximately in the plane of the upper surface of the solder, a float resting in said bath, lever mechanism for depressing said float so as to raise the level of the solder, and means for moving a part to be soldered across said guides and into engagement with said lever mechanism so as to cause said float to be actuated.

In testimony whereof, I sign this specification in the presence of two witnesses.

FRANCIS P. McCOLL.

Witnesses:
    JESSIE M. PEABODY,
    F. T. ELDRIDGE.